(12) United States Patent
Bilton et al.

(10) Patent No.: US 8,572,975 B2
(45) Date of Patent: *Nov. 5, 2013

(54) SYSTEMS RELATING TO TURBINE ENGINE CONTROL AND OPERATION

(75) Inventors: Timothy R. Bilton, Simpsonville, SC (US); Dean M. Erickson, Simpsonville, SC (US); Brian M. Gallagher, Simpsonville, SC (US); Korey F. Rendo, Greer, SC (US); John V. Hains, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1185 days.

This patent is subject to a terminal disclaimer.

(21) Appl. No.: 12/480,239

(22) Filed: Jun. 8, 2009

(65) Prior Publication Data

US 2010/0307158 A1 Dec. 9, 2010

(51) Int. Cl.
F02C 7/08 (2006.01)
F02C 7/22 (2006.01)
F02C 7/224 (2006.01)

(52) U.S. Cl.
USPC .................. 60/736; 60/772; 60/773; 60/805; 60/806

(58) Field of Classification Search
USPC ............. 60/736, 805, 806, 772, 773, 39.281, 60/39.465
See application file for complete search history.

(56) References Cited

U.S. PATENT DOCUMENTS

| | | | | |
|---|---|---|---|---|
| 2,865,724 A * | 12/1958 | Arnold | ......................... | 48/127.1 |
| 5,820,260 A * | 10/1998 | Vander Heyden et al. | ...... | 374/37 |
| 5,845,481 A * | 12/1998 | Briesch et al. | .................. | 60/776 |
| 6,082,092 A * | 7/2000 | Vandervort | ..................... | 60/773 |
| 6,269,626 B1 * | 8/2001 | Kim | ........................... | 60/39.182 |
| 6,343,462 B1 * | 2/2002 | Drnevich et al. | ............... | 60/775 |
| 6,820,428 B2 * | 11/2004 | Wylie | .............................. | 60/772 |
| 7,246,938 B2 * | 7/2007 | Ševčík | ............................ | 374/36 |
| 7,395,670 B1 * | 7/2008 | Drnevich et al. | ............... | 60/780 |
| 7,396,228 B2 * | 7/2008 | Tanabe et al. | ................... | 431/12 |
| 2007/0113560 A1 * | 5/2007 | Steber et al. | ..................... | 60/773 |
| 2008/0289339 A1 * | 11/2008 | Asti et al. | ....................... | 60/734 |

* cited by examiner

*Primary Examiner* — Ehud Gartenberg
*Assistant Examiner* — Karthik Subramanian
(74) *Attorney, Agent, or Firm* — Mark E. Henderson; Ernest G. Cusick; Frank A. Landgraff

(57) ABSTRACT

A combustion turbine engine that includes: a compressor; a combustor that receives fuel from a fuel line; a turbine; a heat exchange portion comprising a portion of the fuel line in heat transfer relationship with a heat source for heating the fuel; a rapid heating value meter disposed to test the heating value of the fuel that is configured to provide heating value test results within approximately 1 minute; a cold leg bypass comprising a fuel line that bypasses the heat exchange portion, the cold leg bypass being connected to the fuel line at an upstream fork and at a fuel mixing junction; and valves for controlling the fuel being directed through the heat exchange portion and the fuel being direct through the cold leg bypass; wherein the length of fuel line between the fuel mixing junction and the combustor is less than 20 meters.

12 Claims, 11 Drawing Sheets

SYSTEMS RELATING TO TURBINE ENGINE CONTROL AND OPERATION

BACKGROUND OF THE INVENTION

This present application relates generally to methods, systems, and/or apparatus for improving the efficiency and/or operation of gas turbine engines, which, as used herein and unless specifically stated otherwise, is meant to include all types of gas or combustion turbine or rotary engines, including aircraft engines, power generating engines and others. More specifically, but not by way of limitation, the present application relates to methods, systems, and/or apparatus pertaining fuel delivery methods and systems in combustion turbine engines.

In general, gas turbine engines include a compressor, a combustor, and a turbine. The compressor and turbine generally include rows of blades that are axially stacked in stages. Each stage includes a row of circumferentially-spaced stator blades, which are fixed, and a row of rotor blades, which rotate about a central axis or shaft. In operation, generally, the compressor rotor blades rotate about the shaft, and, acting in concert with the stator blades, compress a flow of air. The supply of compressed air then is used in the combustor to combust a supply of fuel. Then, the resulting flow of hot gases from the combustion, i.e., the working fluid, is expanded through the turbine section of the engine. The flow of working fluid through the turbine induces the rotor blades to rotate. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electric power is generated.

It is known in the art to utilize the exhaust gas from a combustion turbine engine to preheat fuel. For several reasons, fuel delivered at elevated temperatures may promote efficient engine operation. At times, it is necessary to vary the temperature of the fuel based on changing fuel characteristics. However, conventional fuel delivery systems have certain limitations that result in difficulties or delays in controlling the temperature of fuel as it is delivered to the combustor. This may lead to the fuel being delivered at temperatures that are not acceptable.

More specifically, combustion turbine engines generally are designed to operate using fuels having certain characteristics relating to heating value. The heating value of a fuel, which also may be referred to as the gross calorific value, gross energy or Wobbe Index rating, generally describes the amount of heat or energy released when the fuel is combusted. In combustion turbine engine applications, though, the amount of energy released by a fuel being combusted through a fuel nozzle at a given pressure ratio may be more accurately described if the temperature at which the fuel is delivered to the nozzle is taken into account. The fuel characteristic that takes into account or compensates for the temperature of the fuel is generally referred to as the Modified Wobbe Index rating or MWI rating. Accordingly, this term will be used in this application; though, its usage is not intended to be limiting. As used herein, Modified Wobbe Index rating or MWI rating is intended to broadly refer to a fuel measure describing the amount of energy released by a fuel being combusted through a fuel nozzle at a given pressure ratio that takes into account or compensates for the temperature at which the fuel is delivered to the nozzle. Combustion turbine engines, therefore, are generally designed to operate with fuels that have a specific Modified Wobbe Index rating or fall within a range of acceptable Modified Wobbe Index ratings. This being the case, having the capability to modify or control the temperature of the fuel being delivered to the combustor (thereby modifying or controlling the Modified Wobbe Index rating of the fuel) is a useful way to insure the engine is using acceptable fuel that promotes efficient operation and reduces the risk of combustor damage.

However, given the limitations of conventional systems, as discussed in more detail below, variable fuel conditions may result in fuel being delivered to the combustor outside of the acceptable or targeted Modified Wobbe Index rating. Put another way, in conventional systems, fuel often is delivered to the combustor outside of a temperature range that provides the acceptable or targeted Modified Wobbe Index rating. This may result in damage to the combustor and inefficient engine performance. Further, it may result in a turbine engine "runback" situation, during which, generally, the operating system of the engine automatically reduces or cuts engine output to avoid engine damage that may occur because of the fuel not meeting engine specifications. Of course, sudden drops in engine output may come at inopportune moments, such as during peak demand, and result in significant issues in their own right.

In general, there are several reasons for these type of performance shortcomings in turbine engine fuel delivery systems of conventional design. One of these, as described in more detail below, is a thermal lag that occurs in manipulating fuel temperature. Another is associated with the timely detection of variable fuel characteristics, such as heating value, within a fuel supply, making it impossible to timely determine the appropriate temperature at which the fuel should be delivered to the combustor. As a result, there is a need for improved apparatus, methods and/or systems relating to the delivery of fuel in combustion turbine engines and, particularly, for controlling the temperature of the fuel so that it is consistently delivered to the combustor at a temperature that is appropriate given its heating value and targeted Modified Wobbe Index rating for the engine.

BRIEF DESCRIPTION OF THE INVENTION

The present application thus describes a fuel delivery system for a combustion turbine engine that may comprise: a fuel line connected to a source of fuel and connected to a combustor of the combustion turbine engine, the fuel line having a heat exchange portion disposed in heat transfer relationship with a heat source for heating the fuel prior to the fuel being delivered to the combustor; a rapid heating value meter disposed to measure the heating value of the fuel; a cold leg bypass comprising an alternate fuel line that bypasses the heat exchange portion of the fuel line, the cold leg bypass being connected to the fuel line at an upstream fork, which is disposed upstream of the heat exchange portion, and at a fuel mixing junction, which is disposed downstream of the heat exchange portion; and means for controlling the amount of fuel being directed through the heat exchange portion and the amount of fuel being direct through the cold leg bypass; wherein the fuel mixing junction is positioned close enough to a combustor gas control valve, which comprises a fuel valve positioned upstream and in close proximity to the inlet to the combustor, such that a change by the means for controlling the amount of fuel directed through the cold leg bypass and the amount of fuel directed through the heat exchange portion causes a change in fuel temperature at the combustor gas control valve in a relatively short period of time, and far enough away from the combustor gas control valve such that the fuel has sufficiently mixed to a substantially uniform temperature before reaching the combustor gas control valve.

The present application further describes a combustion turbine engine that may comprise: a compressor for compressing air for combustion; a combustor connected to the compressor for receiving compressed air from the compressor and fuel from a fuel line connected to a source of fuel, the fuel being combusted therein and producing a combustion gas; a turbine connected to the combustor and arranged to receive the combustion gas for driving the turbine; a heat exchange portion of the fuel line comprising a portion of the fuel line disposed in heat transfer relationship with a heat source for heating the fuel prior to the fuel being delivered to the combustor; a rapid heating value meter disposed to test the heating value of the fuel that is configured to provide heating value test results within approximately 1 minute of beginning the testing process; a cold leg bypass comprising an alternate fuel line that bypasses the heat exchange portion of the fuel line, the cold leg bypass being connected to the fuel line at an upstream fork, which is disposed upstream of the heat exchange portion, and at a fuel mixing junction, which is disposed downstream of the heat exchange portion; and means for controlling the amount of fuel being directed through the heat exchange portion and the amount of fuel being direct through the cold leg bypass; wherein the fuel mixing junction is positioned such that the length of fuel line between the fuel mixing junction and an inlet to the combustor is less than approximately 20 meters.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
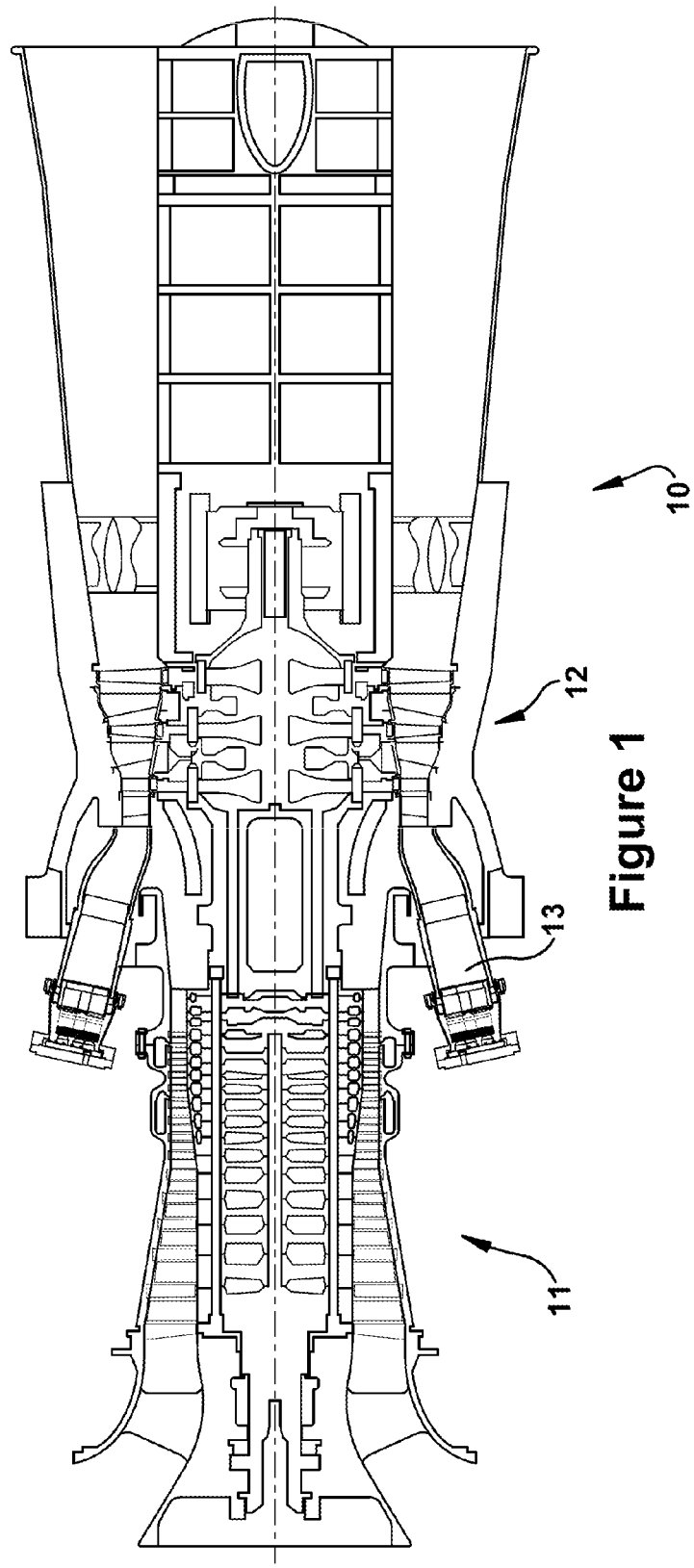
FIG. 1 is a schematic representation of an exemplary turbine engine in which certain embodiments of the present application may be used.

Referring now to the figures, FIG. 1 illustrates a schematic representation of a gas turbine engine 10, which will be used to describe an exemplary environment in which the present invention may be employed. It will be understood by those skilled in the art that the present invention is not limited to this type of usage. As stated, the present invention may be used in other types of gas turbine engines. In general, gas turbine engines operate by extracting energy from a pressurized flow of hot gas that is produced by the combustion of a fuel in a stream of compressed air. As illustrated in FIG. 1, gas turbine engine 10 may be configured with an axial compressor 11 that is mechanically coupled by a common shaft or rotor to a downstream turbine section or turbine 12, and a combustor 13 positioned between the compressor II and the turbine 12.

Figure 2:
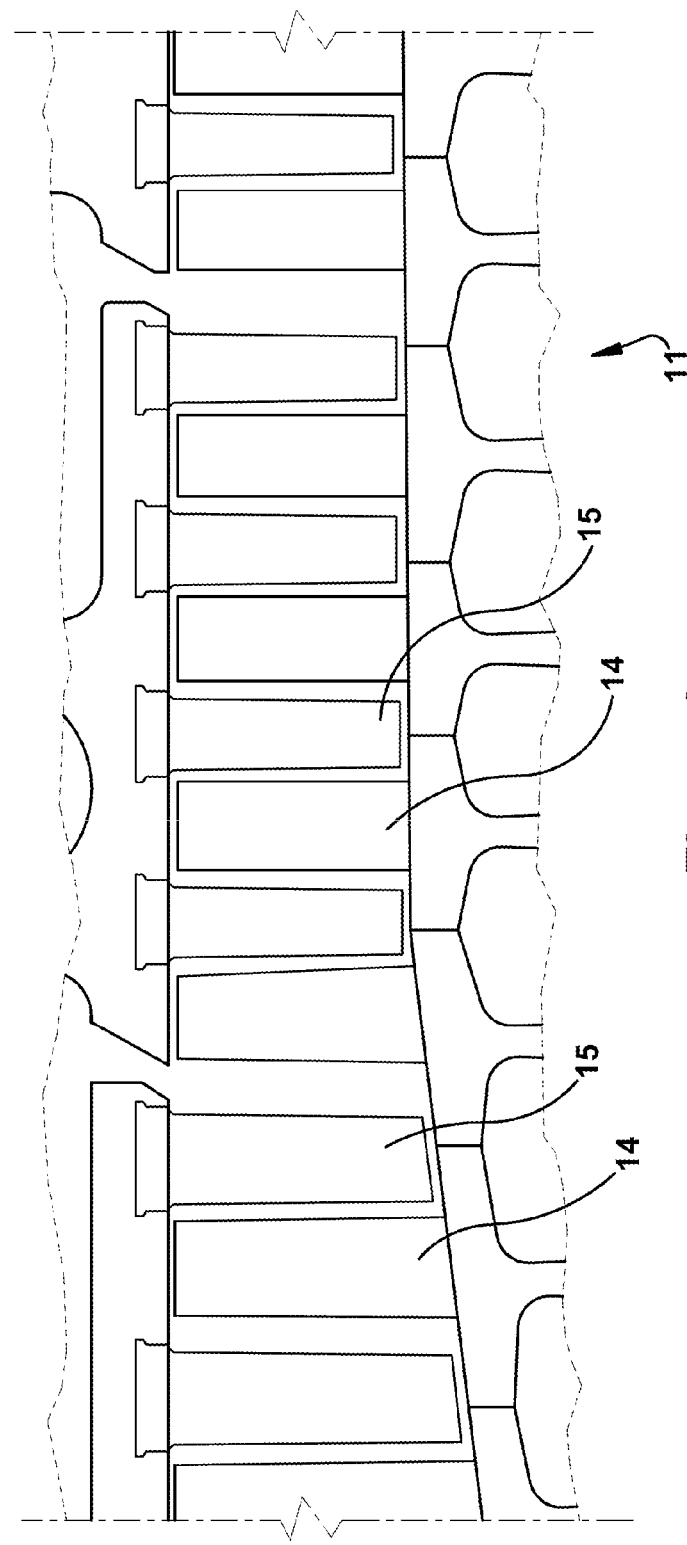
FIG. 2 is a sectional view of the compressor section of the gas turbine engine of FIG. 1.

FIG. 2 illustrates a view of an exemplary multi-staged axial compressor 11 that may be used in the gas turbine engine of FIG. 1. As shown, the compressor 11 may include a plurality of stages. Each stage may include a row of compressor rotor blades 13 followed by a row of compressor stator blades 14. Thus, a first stage may include a row of compressor rotor blades 13, which rotate about a central shaft, followed by a row of compressor stator blades 14, which remain stationary during operation. The compressor stator blades 14 generally are circumferentially spaced one from the other and fixed about the axis of rotation. The compressor rotor blades 13 are circumferentially spaced and attached to the shaft; when the shaft rotates during operation, the compressor rotor blades 13 rotate about it. As one of ordinary skill in the art will appreciate, the compressor rotor blades 13 are configured such that, when spun about the shaft, they impart kinetic energy to the air or fluid flowing through the compressor 11. The compressor 11 may have other stages beyond the stages that are illustrated in FIG. 2. Additional stages may include a plurality of circumferential spaced compressor rotor blades 13 followed by a plurality of circumferentially spaced compressor stator blades 14.

Figure 3:
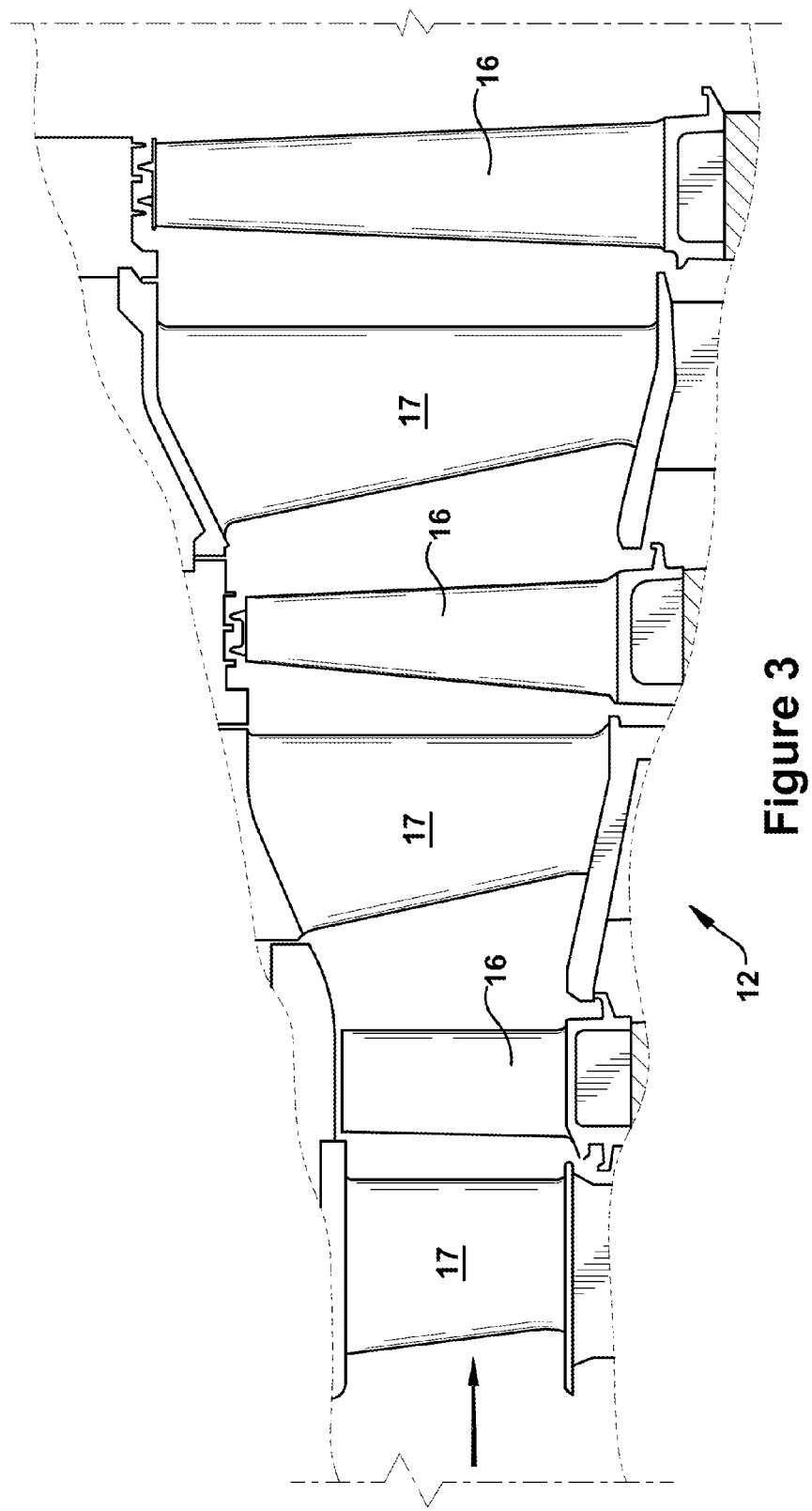
FIG. 3 is a sectional view of the turbine section of the gas turbine engine of FIG. 1.

FIG. 3 illustrates a partial view of an exemplary turbine section or turbine 12 that may be used in the gas turbine engine of FIG. 1. The turbine 12 also may include a plurality of stages. Three exemplary stages are illustrated, but more or less stages may present in the turbine 12. A first stage includes a plurality of turbine buckets or turbine rotor blades 15, which rotate about the shaft during operation, and a plurality of nozzles or turbine stator blades 16, which remain stationary during operation. The turbine stator blades 16 generally are circumferentially spaced one from the other and fixed about the axis of rotation. The turbine rotor blades 15 may be mounted on a turbine wheel (not shown) for rotation about the shaft (not shown). A second stage of the turbine 12 also is illustrated. The second stage similarly includes a plurality of circumferentially spaced turbine stator blades 16 followed by a plurality of circumferentially spaced turbine rotor blades 15, which are also mounted on a turbine wheel for rotation. A third stage also is illustrated, and similarly includes a plurality of turbine stator blades 16 and rotor blades 15. It will be appreciated that the turbine stator blades 16 and turbine rotor blades 15 lie in the hot gas path of the turbine 12. The direction of flow of the hot gases through the hot gas path is indicated by the arrow. As one of ordinary skill in the art will appreciate, the turbine 12 may have other stages beyond the stages that are illustrated in FIG. 3. Each additional stage may include a row of turbine stator blades 16 followed by a row of turbine rotor blades 15.

In use, the rotation of compressor rotor blades 13 within the axial compressor 11 may compress a flow of air. In the combustor 13, energy may be released when the compressed air is mixed with a fuel and ignited. The resulting flow of hot gases from the combustor 13, which may be referred to as the working fluid, is then directed over the turbine rotor blades 15, the flow of working fluid inducing the rotation of the turbine rotor blades 15 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 13, such that the necessary supply of compressed air is produced, and also, for example, a generator to produce electricity.

Before proceeding further, note that in order to communicate clearly the invention of the current application, it may be necessary to select terminology that refers to and describes certain machine components or parts of a turbine engine. Whenever possible, common industry terminology will be used and employed in a manner consistent with its accepted meaning. However, it is meant that any such terminology be given a broad meaning and not narrowly construed such that the meaning intended herein and the scope of the appended claims is unreasonably restricted. Those of ordinary skill in the art will appreciate that often certain components may be referred to with several different names. In addition, what may be described herein as a single part may include and be referenced in another context as consisting of several component parts, or, what may be described herein as including multiple component parts may be fashioned into and, in some cases, referred to as a single part. As such, in understanding the scope of the invention described herein, attention should not only be paid to the terminology and description provided, but also to the structure, configuration, function, and/or usage of the component as described herein.

In addition, several descriptive terms that are common to turbine engine applications may be used herein. The definitions for these terms are as follows. The term "downstream" and "upstream" are terms that indicate a direction relative to the flow of working fluid through the turbine or a condo. As such, the term "downstream" means in the direction of the flow, and the term "upstream" means in the opposite direction of the flow through the turbine. Related to these terms, the terms "aft" and/or "trailing edge" refer to the downstream direction, the downstream end and/or in the direction of the downstream end of the component being described. And, the terms "forward" or "leading edge" refer to the upstream direction, the upstream end and/or in the direction of the upstream end of the component being described. The term "radial" refers to movement or position perpendicular to an axis. It is often required to describe parts that are at differing radial positions with regard to an axis. In this case, if a first component resides closer to the axis than a second component, it may be stated herein that the first component is "inboard" or "radially inward" of the second component. If, on the other hand, the first component resides further from the axis than the second component, it may be stated herein that the first component is "outboard" or "radially outward" of the second component. The term "axial" refers to movement or position parallel to an axis. And, the term "circumferential" refers to movement or position around an axis.

Figure 4:
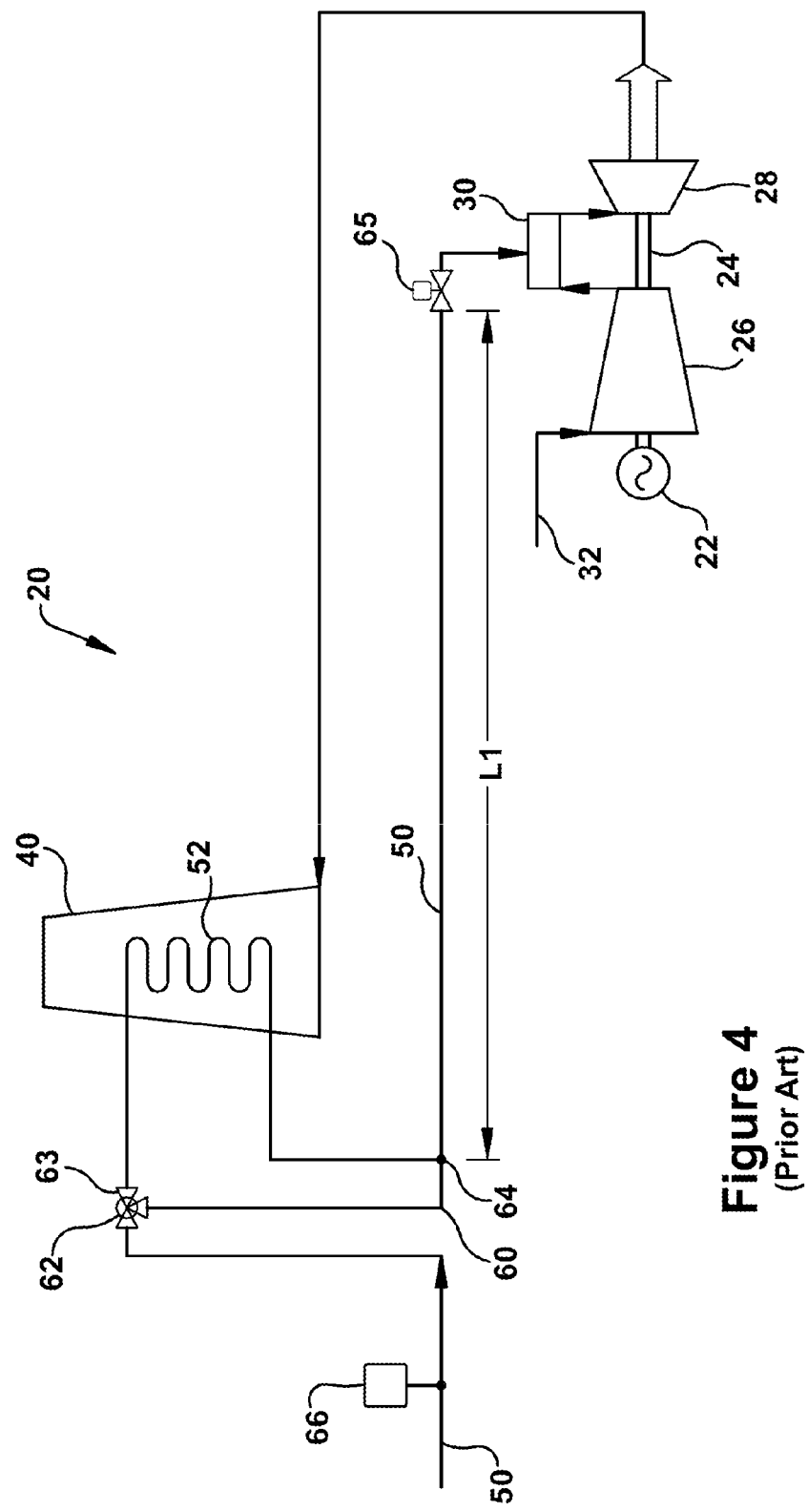
FIG. 4 is a schematic representation of a fuel delivery system of a combustion turbine system according to conventional design.

Referring again to the figures, FIG. 4 illustrates an example of a combustion turbine system according to conventional design: a combustion turbine system 20. The combustion turbine system 20 may include an electric generator 22 that is connected by a rotor shaft 24 to a compressor 26 and a turbine 28. The connections and configuration of these components may be made pursuant to conventional technology. A conventional combustor 30 may be positioned between the compressor 26 and the turbine 28.

An air intake line 32 may be connected to the compressor 26. The air intake line 32 provides the inlet to the compressor 26. A first conduit then may connect the compressor 26 to the combustor 30 and may direct the air that is compressed by the compressor 26 into the combustor 30. As described above, the combustor 30 generally combusts the supply of compressed air with a fuel in a know manner to produce a hot compressed motive gas. The motive gas is conducted from the combustor 30 by a second conduit and directed to the turbine 28. The supply of combustion gases drives the turbine 28. The turbine 28, driven by the motive gas turns rotor shaft 24, rotates the shaft or rotor shaft 24, the energy of which may be used to drive the compressor 26 and the generator 22, thereby producing electricity.

The exhaust gas from turbine 28 generally is conducted by a third conduit to an exhaust stack 40 from where the exhaust gas is discharged to the atmosphere. The temperature of the exhaust gas in the stack 40 may exceed 800° F. A fuel line 50 may extend from a source of fuel (not shown) to the combustor 30 for delivering fuel to the combustor 30. The fuel line 50 may have a heat exchange portion 52 disposed in the stack 40. In the heat exchange portion 52, the fuel line 50 may be disposed in heat transfer relationship with the hot exhaust gas traveling through the stack 40. The fuel line 50 may convey a liquid fuel or a gaseous fuel such as methane as is customary in combustion turbine systems. In practice, heating of liquid fuels may be limited to a low temperature, about 200° F. to prevent thermal decomposition of the fuel's constituents. Natural gas, however, may be heated up to 1000° F., depending on certain factors.

The combustion turbine system 20 may also include a bypass fuel line 60. The bypass fuel line 60 may be connected to the fuel line 50 at a point upstream of the heat exchange portion 52, an upstream fork 62, which, as shown, may include an upstream fuel bypass control valve 63 (in this case, a conventional three-way valve) and at another point downstream of the heat exchange portion 52, a fuel mixing junction 64, thereby creating a fuel line that bypasses the heat exchange portion 52 of the fuel line 50, as illustrated. Given this configuration, the upstream fuel bypass control valve 63 may regulate the amount of fuel that bypasses the heat exchanger 52, and, by doing this, the upstream fuel bypass control valve 63 may be used to control the temperature of the supply of fuel flowing to the combustor 30. In this manner, i.e., by manipulating the amount of the fuel supply that bypasses the heat exchanger 52 and then combining the heated and unheated fuel flows downstream, the conventional turbine system 20 may at least partially control the temperature of the fuel when it is delivered to the combustor 30.

As discussed in more detail below, however, in operation, conventional systems have a temperature lag that makes relatively timely or quick fuel temperature modifications substantially impossible. Among other reasons, this is because conventional systems, such as the one shown in FIG. 4, include a relatively lengthy stretch of fuel line 50 between the fuel mixing junction 64 and the combustor 30. This stretch of fuel line generally terminates at a valve just upstream of the combustor 30, which herein is referred to as a combustor gas control valve 65. As illustrated in FIG. 4, this distance is referenced as distance "L1". L1 indicates the length of conduit between the fuel mixing junction 64 and the combustor gas control valve 65/the inlet of the combustor 30. In conventional systems, the distance L1 is at least greater than 20 m, and, typically, greater than 50 in. The lengthy run of conduit between the mixing junction 64 and the combustor 30 makes the relatively quick adjustment of the temperature of the fuel being delivered to the combustor 30 impossible. It will be appreciated that this delay is caused by the heat sink properties of the length of conduit that resist changing fuel temperatures and/or the required purging of fuel already in the conduit before fuel of an adjusted temperature may be delivered to the combustor 30.

In some instances, conventional systems also may include a conventional gas chromatograph 66 or other similar device. As one of ordinary skill narrow appreciate, a gas chromatograph 66 may be used to test the fuel supply to determine the makeup of its separate components and/or its heating value. More particularly, the gas chromatograph 66 may be used to sample the fuel supply and measure the relative amount of its various components. In this manner, a conventional system may determine the breakdown of the different hydrocarbons within the supply of fuel and provide data relating to the heating value of the fuel supply. Generally, however, there is a significant time delay associated with the gas chromatograph 66 and the other similar testing devices generally used in conventional systems. That is, there is a significant delay between the time the chromatograph 66 takes a sample from the fuel supply and provides a control system with the relevant or necessary test results or information relating to the chemical makeup or heating value of a fuel. The delay associated with a chromatograph (and/or the other similar devices generally used in conventional systems for the same purpose) is relatively considerable (often several minutes or more), and, as discussed in more detail below, often provided after modifications to the engine control settings are necessary (i.e., test results that are not "timely"). In other words, the test results are provided too late. The chromatograph and/or the other similar devices do not provide readily available and timely information as to the heating value of the fuel supply, which may lead to fuel being delivered to the engine outside of the engine's targeted Modified Wobbe Index range. This may result in engine damage, runbacks, or other performance issues. In many cases, this delay is exacerbated by the temperature lag discussed above.

As one of ordinary skill in the art will appreciate, in addition to the components shown, the combustion turbine system 20 as well as the combustion turbine systems of the exemplary embodiments described hereafter, i.e., FIGS. 5 through 10, also may include other components, such as coalescing filters, fuel gas scrubbers, start-up heaters, etc. It will be appreciated, however, that the inclusion and configuration of these elements is not critical to the operation of the invention claimed herein, and, thus, these components are not shown in the figures provided.

FIGS. 5 through 10 illustrate exemplary embodiments of the present application. Many of the components in the systems illustrated in FIGS. 5 through 10 are substantially the same or similar to the components described above in relation to the system of FIG. 4. Accordingly, for the sake of clarity and brevity, the numerical identifiers used in FIG. 4 also will be used in FIGS. 5 through 10 for the common components. The combustion turbine system 70 may include, per conventional design, an electric generator 22 connected by a rotor shaft 24 to a compressor 26 and a turbine 28. A combustor 30 may be positioned between the compressor 26 and the turbine 28. An air intake line 32 may be connected to the compressor 26 such that an inlet for a supply of air is provided. A first conduit may direct the air compressed by the compressor 26 to the combustor 30, where it may be used to combust a supply of fuel. The resulting flow of hot gases may be expanded through the turbine 28, where, as described above, the energy is transformed into the mechanical energy of the rotating shaft 24. The energy of the rotating shaft then may be used to drive the compressor 26 and the generator 22, thereby producing, respectively, the supply of compressed air and electricity. This combustion turbine engine application, though, is exemplary; the current invention also may be used in other combustion turbine engine applications.

According to an exemplary embodiment of the present application, the combustion turbine system 70 is configured such that the temperature of the fuel delivered to the combustor 30 may be controlled in a timely manner by a system operator or control unit such that the fuel meets the target MWI value for the engine. As described above, combustion turbine engines generally are designed to operate using fuels having certain characteristics relating to heating value. The heating value of a fuel, which also may be referred to as the gross calorific value, gross energy or Wobbe Index rating, generally describes the amount of heat or energy released when the fuel is combusted. In combustion turbine engine applications, though, the amount of energy released by a fuel being combusted through a fuel nozzle at a given pressure ratio may be more accurately described if the temperature at which the fuel is delivered to the nozzle is taken into account. The fuel characteristic that takes into account or compensates for the temperature of the fuel is commonly referred to as the Modified Wobbe Index rating or MWI rating. As used herein, Modified Wobbe Index or MWI is intended to broadly refer to a fuel measure describing the amount of energy released by a fuel being combusted through a fuel nozzle at a given pressure ratio that takes into account or compensates for the temperature at which the fuel is delivered to the nozzle. Combustion turbine engines, therefore, are generally designed to operate with fuels that have a specific Modified Wobbe Index rating or fall within a range of acceptable Modified Wobbe Index ratings. As used herein, the specific Modified Wobbe Index rating or range of acceptable Modified Wobbe Index ratings for which a combustion turbine engine is designed are both referred to as a "target Modified Wobbe Index range" or "target MWI range". Having the capability to modify or control the temperature of the fuel being delivered to the combustor (thereby modifying or controlling the Modified Wobbe Index rating of the fuel) is a useful way to insure the engine is using fuel that is within the engine's target MWI range.

Note that the several embodiments of FIGS. 5 through 10 illustrate several alternative heat sources that may be used in the present invention. Except where specifically stated, the present invention is intended to include as alternatives these heat sources as well as equivalents thereof, each of which has certain advantages, which are discussed below. Further, though not specifically illustrated in the figures, the present invention may employ the same or similar heat source as described above in relation to the system of FIG. 4 (i.e., a heat exchanger powered by the exhaust of the turbine engine, which may include a hot water or steam heater for which the hot water or steam comprises a heat transfer fluid that is heated by the exhaust of the engine). As shown, the embodiment of FIG. 5 includes an oil or water bath heater 71. As one of ordinary skill in the art will appreciate, a conventional bath heater 71 includes a heat transfer fluid, which may be water or, for more elevated temperatures, thermal oil, that is heated and used in a heat exchanger to heat the fuel that passes therethrough. The bath heater 71 may include a pump 72 that circulates the heat transfer fluid between a heater and the heat exchanger. The supply of fuel for the bath heater 71 may be bled from the fuel line 50 (not shown). One of the advantages of using the bath heater 71 is that it may heat the fuel supply of fuel line 50 without using heat from the turbine engine. It will be appreciated that this may be advantageous during engine startup when heat from the turbine engine is substantially unavailable.

A fuel line 50 may extend from a fuel source (not shown) to the combustor 30. Similar to the conventional system described above, the fuel line 50 may be configured such that a heat exchange portion 52 extends through the bath heater 71 where, as stated, the fuel supply may be heated.

Figure 5:
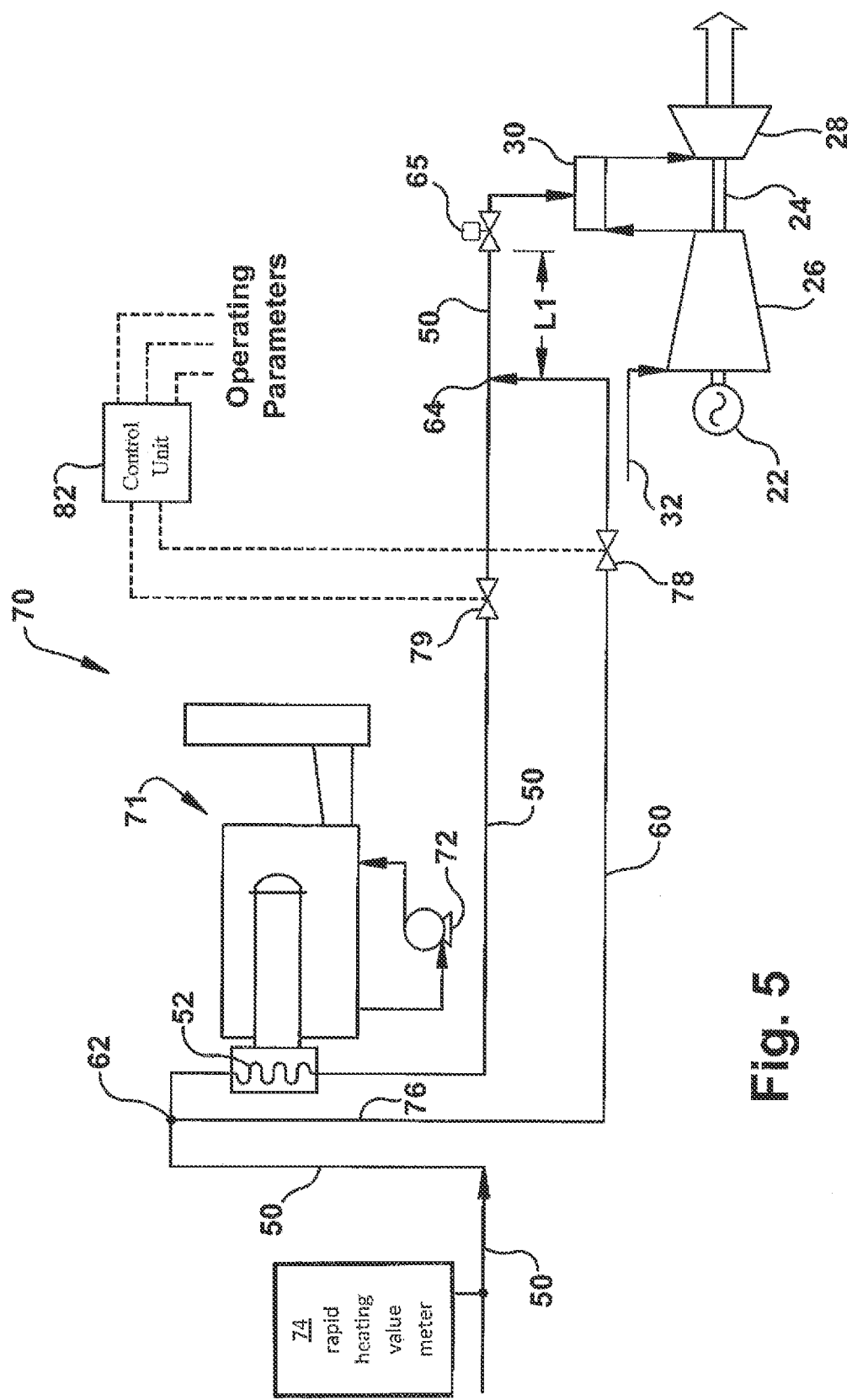
FIG. 5 is a schematic representation of a fuel delivery system of a combustion turbine engine according to an exemplary embodiment of the present application.

The combustion turbine system 70 of FIG. 5 also may include a cold leg bypass 76. The cold leg bypass 76 may be similar in certain aspects to the bypass fuel line 60 described above. As shown, the cold leg bypass 76 connects to the fuel line 50 at a point upstream of the heat exchange portion 52 of the fuel line 50, which may be referred to as an upstream fork 62, and at another point downstream of the heat exchange portion 52 of the fuel line 50, which may be referred to as a fuel mixing junction 64. In this manner, the cold leg bypass 76 forms an alternate or bypass route through which the supply of fuel may travel to the combustor 30 without being heated in the heat exchange portion 52 of the bath heater 71.

Figure 8:
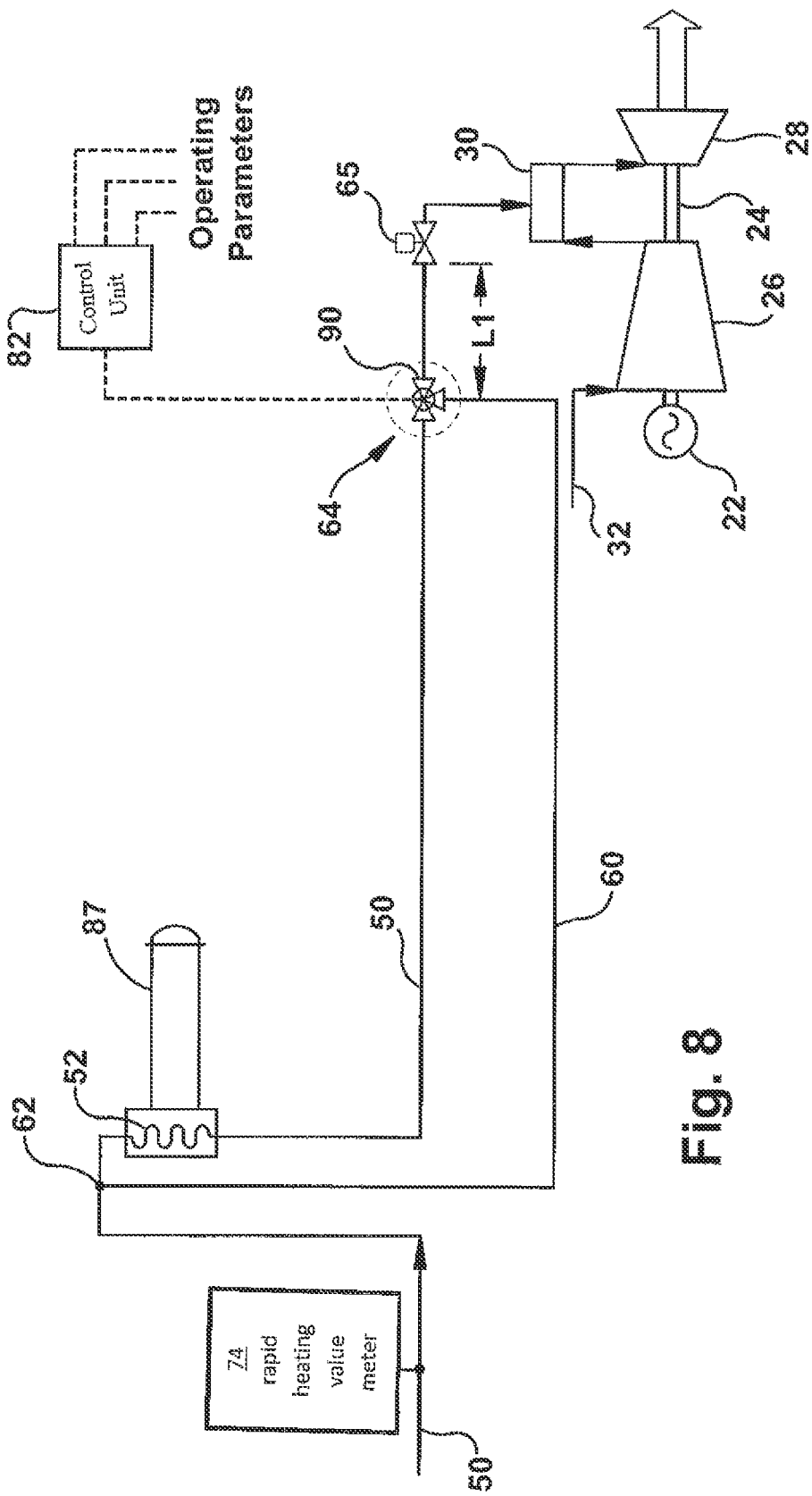
FIG. 8 is a schematic representation of a fuel delivery system of a combustion turbine engine according to an alternative embodiment of the present application.

As described in more detail below, the amount of fuel flowing through the heat exchange portion 52 of the fuel line 50 and the cold leg bypass 76 may be governed or controlled or manipulated by the operation of one or more conventional valves, each of which may have at least a plurality of flow settings that allow different levels of fuel flow therethrough. In some embodiments, the combustion turbine system 70 may control the flow levels between the two alternate routes via a single conventional two-way valve, which may be positioned in either the fuel line 50 or the cold leg bypass 76. In other embodiments, as shown in FIG. 5, the combustion turbine system 70 may control the flow levels more accurately through the cold leg bypass 76 and the heat exchange portion 52 of the fuel line 50 via two conventional two-way valves, a cold leg valve 78 positioned on the cold leg bypass 76 and a hot leg valve 79 positioned on the fuel line 50. As illustrated, the hot leg valve 79 may be positioned on the fuel line 50 downstream of the upstream fork 62 and upstream of the fuel mixing junction 64. In addition, as illustrated in FIG. 8 and discussed in the accompanying text, the hot leg valve 79 and the cold leg valve 78 may be replaced with a conventional three-way valve 90.

Pursuant to conventional means and methods, the operation and settings of the valves, which, as illustrated in FIG. 5, may include the hot leg valve 79 and the cold leg valve 78, may be controlled by a control unit 82. More particularly, the settings of the valves that regulated the fuel flow through the cold leg bypass 76 and the heat exchange portion 52 of the fuel line 50 may be controlled pursuant to signals received from a control unit 82. The control unit 82, as discussed in more detail below, may comprise an electronic or computer implemented device that includes control logic pertaining to the operation of the one or more valves. Pursuant to this control logic and/or one or more operating parameters monitored by the control unit 82 (as discussed in more detail below), the control unit 82 may send electronic signals to the one or more valves and, thereby, control the settings of the one or more valves. In this manner, the one or more valves may be controlled to reduce flow through the cold leg valve 78 and increase flow through the heat exchange portion 52 of the fuel line 50, or, alternatively, increase flow through the cold leg valve 78 and decrease flow through the heat exchange portion 52 of the fuel line 50.

It will be appreciated that the temperature (and, thus, the MWI rating) of the fuel supply delivered to the combustor 30 may be controlled by manipulating the percentage of the fuel supply that passes through the heat exchange portion 52 of the fuel line 50. For example, if it is desired to increase the temperature (thereby reducing the MWI rating) of the fuel supply delivered to the combustor, the one or more valves may be controlled such that an increased percentage of the fuel supply is directed through the heat exchange portion 52 of the fuel line 50. This will result in an increased fuel temperature downstream of the fuel mixing junction 64. Alternatively, if it is desired to decrease the temperature (thereby increasing the MWI rating) of the fuel supply delivered to the combustor, the one or more valves may be controlled such that a decreased percentage of the fuel supply is directed through the heat exchange portion 59 of the fuel line 50. It will be appreciated that this will result in a decreased fuel temperature downstream of the fuel mixing junction 64.

According to an exemplary embodiment of the present invention, the combustion turbine system 70 further may include a rapid heating value meter 74. As used herein, a rapid heating value meter 74 is defined to include an instrument or device that may be used to test fuels, such as natural gas, and rapidly provide test results or data relating to the heating value of the fuel tested. Further, as used herein, providing "rapid" test results is defined as providing timely test results, or, in regard to other embodiments of the present invention, providing test results within the time periods specified herein.

In some embodiments, the rapid fuel heating value meter 74 may comprise a gas calorimeter. As one of ordinary skill in the art will appreciate, a gas calorimeter is an instrument that measures the heating value of a fuel. As described above, the heating value of a fuel, which is also known as the gross calorific value, gross energy or Wobbe Index rating, is defined herein to generally describe the amount of heat or energy released when the fuel is combusted. In some embodiments, the rapid heating value meter 74 of the present invention may comprises the following devices and/or other similar devices that are configured to meet the other operational requirements described herein: a Wobbe meter, a gas calorimeter, or a heating value transmitter. As shown, in some embodiments, the rapid heating value meter 74 may be located upstream of the upstream fork 62, though other locations, such as on the cold stream bypass 76, are also possible in other embodiments.

In some embodiments, the rapid heating value meter 74, in operation, may be configured such that it periodically samples and tests the heating value of the supply of fuel being delivered to the combustor 30. The periodic testing of the fuel supply by the rapid heating value meter 74 may occur within at least approximately every 60 seconds. In other more preferred embodiments the periodic testing of the fuel supply by the rapid heating value meter 74 may occur within at least approximately every 30 seconds. In still other more preferred embodiments, the periodic testing of the fuel supply by the rapid heating value meter 74 may occur within at least approximately every 15 seconds.

As stated, the rapid heating value meter 74 may be configured to complete the testing of the fuel and provide data concerning the heating value of the fuel within a relatively short time period. In some embodiments, the rapid heating value meter 74 comprises a device that is configured to complete the heating value testing and provide results in within at least approximately 2 minutes of taking the test sample and beginning the testing procedures. In other more preferred embodiments, the rapid heating value meter 74 may be configured to complete the heating value testing and provide results within at least approximately 1 minute of taking the test sample and beginning the testing procedures. In still other more preferred embodiments, the rapid heating value meter 74 may be configured to complete the heating value testing and provide results within at least approximately 30 seconds of taking the test sample and beginning the testing procedures. Ideally, in other embodiments, the rapid heating value meter 74 may be configured to complete the heating value testing and provide results within at least approximately 10 seconds of taking the test sample and beginning the testing procedures. The rapid heating value meter 74 and the control unit 82 generally may be configured to communicate electronically. More particularly, the rapid heating value meter 74 may send data relating to the testing of the heating value of the fuel supply to the control unit 82 per conventional means and methods.

The combustion turbine system 70 further may include conventional instruments to measure the temperature of the fuel supply at one or more locations within the fuel delivery system (not shown). For example, at the same location as the rapid heating value meter 74, a thermocouple or other temperature measuring instrument may also be included and/or integrated into the rapid heating value meter 74 such that the temperature of the fuel supply may be measured at the same time that the heating value is determined and communicated to the control unit 82. At this location, this temperature measurement provides what will be referred to herein as an "unheated fuel temperature", i.e., the temperature of the fuel before heating or before significant heating. A second thermocouple or other temperature measuring instrument may be located between the outlet of the heat exchange portion 52 and the fuel mixing junction 64. This temperature measurement provides what will be referred to herein as a "heated fuel temperature", i.e., the temperature of the fuel after it has been heated. A third thermocouple or other instrument may be located at the inlet of the combustor 30 or at the inlet of the combustor gas control valve 65. This temperature measurement provides what will be referred to herein as a "mixed fuel temperature", i.e., the temperature of the fuel generally downstream of the fuel mixing junction 64 and/or at the inlet of the combustor 30. The instruments for measuring temperature may communicate measured temperature data to the control unit 82 per conventional means and methods.

As stated, in conventional systems, the distance of conduit or fuel line between the fuel mixing junction and the combustor gas control valve 65/the inlet of the combustor 30 is relatively lengthy. (Note that the "combustor gas control valve 65" is meant to refer to the control valves that occur just upstream and in close proximity to the combustor 30 and, thus, is used substantially interchangeably with the "inlet of the combustor 30" to describe the approximate location where the supply of fuel is introduced to the combustor 30. Specifically, as intended herein, reference to the "combustor gas control valve 65" is approximately the same as reference to the inlet of the combustor 30. Therefore, in a system that for whatever reason has no control valves just upstream or in close proximity to the combustor 30, reference herein to the "combustor gas control valve 65" is meant to refer instead to the inlet of the combustor 30.) It will be appreciated that the distance between the fuel mixing junction 64 and the combustor gas control valve 65, when lengthy, makes it more difficult to rapidly change the temperature of the fuel supply being delivered to the combustor 30, as an extended length of conduit generally forms a heat sink that works against rapid temperature changes and/or an extended length of conduit must be substantially flushed before a significant change in the fuel temperature (and, thus, before a significant change in the MWI rating of the fuel) is felt at the combustor gas control valve 65/inlet of the combustor 30. As a result, in conventional systems, there is a significant delay between the actions taken to change fuel temperature and when the resulting change is felt at the combustor gas control valve 65/the inlet of the combustor 30.

Further, in conventional combustion turbine systems, this delay in the ability to change the temperature of the fuel supply generally is exacerbated by the typical delay associated with obtaining heating value data for the fuel supply from a gas chromatograph or other similar device being used for this purpose. As a result, a conventional combustion turbine system may experience a delay detecting a change in the heating value of the fuel supply, which then may be compounded by a second delay that is generally occasioned in bringing about a change in the temperature of the fuel being supplied at the combustor 30. As described in more detail below, combustion turbine systems that are configured to operate according to exemplary embodiments of the present invention reduce or substantially eliminate these delay issues through the use of a rapid heating value meter 74, which may be configured to provide more timely and rapid fuel supply heating value data to the control unit 82.

Further, exemplary embodiments of the present invention provide a cold leg bypass 76, which allows fuel to bypass the heat exchange portion 52 of the fuel line 50, such that fuel temperature changes (and the resulting changes in the MWI rating of the fuel) may be felt at the inlet of the combustor 30 more rapidly. In some embodiments of the present invention, this result may be achieved by positioning the fuel mixing junction 64 (i.e., the location at which a supply of unheated fuel and heated fuel is mixed to a desired temperature) such that the length of conduit between the fuel mixing junction 64 and the combustor gas control valve 65/the inlet to the combustor 30 is reduced. As stated, by reducing this length of conduit, the mixing of the heated fuel and the unheated fuel may occur in close proximity to the combustor gas control valve 65/the inlet to the combustor 30, which generally allows temperature changes to the fuel reaching the combustor 30 to occur in a relatively quick manner.

It has also been discovered that, in some cases, a minimum distance should remain between the location where the heated and unheated fuel is mixed and the combustor gas control valve 65/the inlet to the combustor 30. This minimum distance allows for the heated and unheated fuel to mix sufficiently such that a relatively uniform fuel temperature through the fuel supply is obtained before the fuel is delivered to and combusted within the combustor 30. It will be appreciated that having a relatively uniform fuel temperature through the fuel supply promotes better engine performance, particularly for the operation of the combustor 30. Given these competing considerations, as part of the invention described herein, preferred ranges of conduit length had been developed. Thus, in some preferred embodiments, the fuel mixing junction 64 may be positioned such that the length of conduit between the fuel mixing junction 64 and the combustor gas control valve 65/the inlet of the combustor 30 is between approximately 2 and 20 meters. More preferably, the fuel mixing junction 64 may be positioned such that the length of conduit between the fuel mixing junction 64 and the combustor gas control valve 65/the inlet of the combustor 30 is between approximately 4 and 15 meters. Ideally, the fuel mixing junction 64 may be positioned such that the length of conduit between the fuel mixing junction 64 and the combustor gas control valve 65/the inlet of the combustor 30 is between approximately 6 and 10 meters. Each of these ranges provides enhanced performance. As stated, with the shorter span of conduit between the location where fuel supply temperature is controlled and the approximate inlet of the combustor, temperature changes (and, thus, changes in the MWI rating of the fuel) may be made more rapidly (i.e., less flushing or purging is required and the conduit acting as a heat sink is reduced). And, the maintenance of a minimal conduit distance provides that adequate mixing of the two fuel supplies is achieved.

FIGS. 6 through 10 illustrate alternative embodiments of the present invention. It will be appreciated that the combustion turbine systems illustrated in FIGS. 6 through 10 are similar in many aspects and function in much the same manner. As such, the discussion of each will focus primarily on the several differences.

Figure 6:
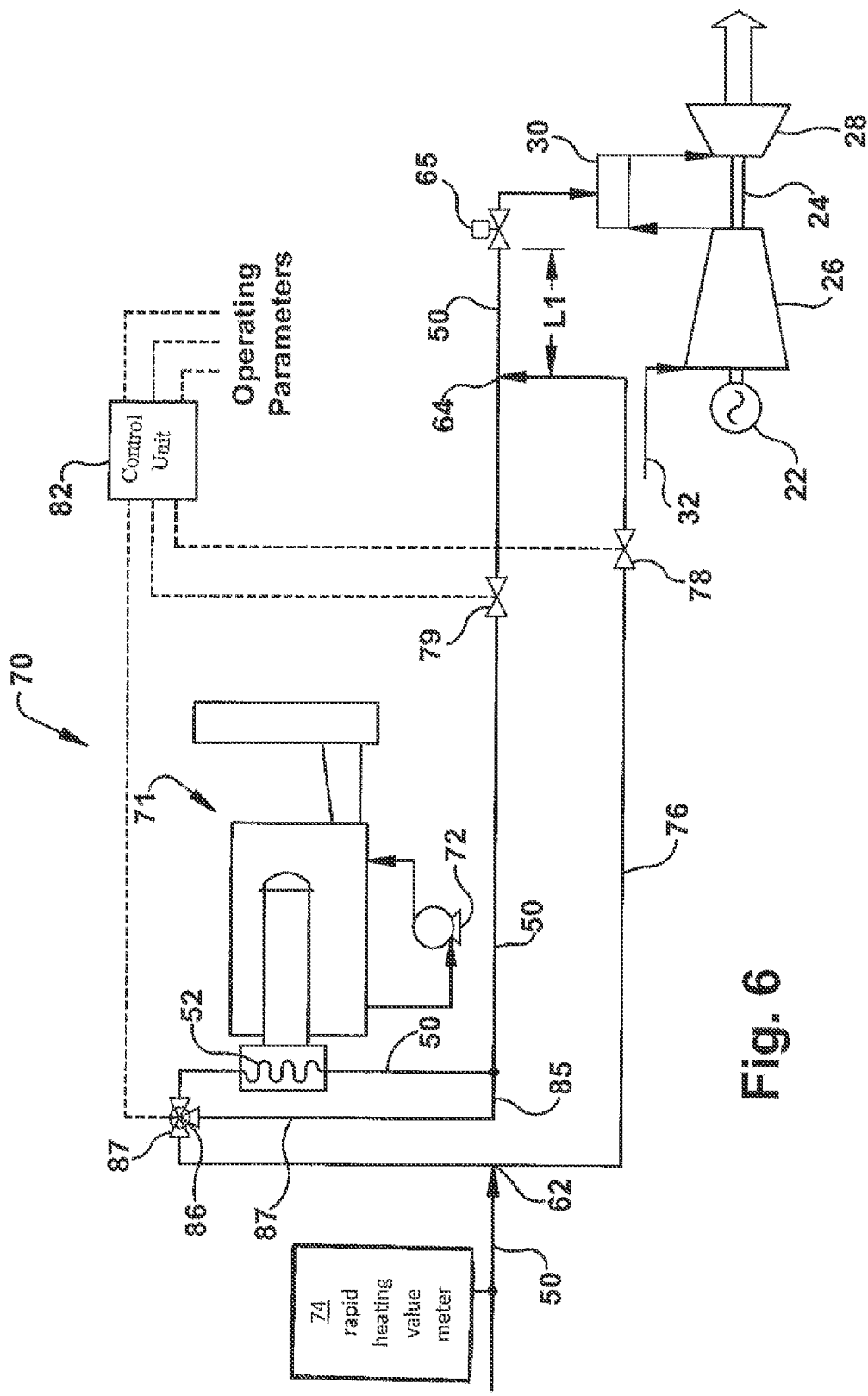
FIG. 6 is a schematic representation of a fuel delivery system of a combustion turbine engine according to an alternative embodiment of the present application.

Referring now to FIG. 6, the combustion turbine system 70 is shown with a modified configuration. As with the system described in relation to FIG. 5, the heat source for the system may be an oil or water bath heater 71. The system of FIG. 6, however, includes an additional bypass fuel line, which will be referred herein to as a second or downstream cold leg bypass 85. The hot leg bypass 85 may comprise a bypass (i.e., a fuel line that bypasses the heat exchange portion 52 of the fuel line 50, that occurs downstream of the upstream fork 62. At an upstream end, the downstream cold leg bypass 85 may connect with the fuel line 50 at a second fork 86. At a downstream end, the downstream cold leg bypass 85 may connect with the fuel line 50 at a point that is downstream of the heat exchange portion 52 of the fuel line 50. A conventional three-way valve 87 may be located at the second fork 86. The three-way valve 87 may control the amount of fuel that is directed to the heat exchange portion 52 and the amount that is directed through the downstream cold leg bypass 85.

It will be appreciated that heat sources that depend from the functioning of the turbine engine (for example, if the heat for the bath heater 71 in FIG. 6 were bled from the exhaust of the turbine engine) may be variable, i.e., produce a variable amount of heat depending on the load or output of the turbine engine. In these cases, the downstream cold leg bypass 85 may provide an additional means to control or regulate the temperature of the heated fuel supply before it arrives at the fuel mixing junction 64. Particularly, fuel may be allowed to bypass the heat exchange portion 52 via the downstream cold leg bypass 85 if, for example, the bath heater 71 is operating at elevated temperatures because the turbine engine is operating at an high output level. In this way, the temperature of the supply of heated fuel that arrives at the fuel mixing junction 64 may be more consistent and predictable, which, ultimately, may provide more efficient and effective temperature control of the fuel supply downstream of the fuel mixing junction 64. It will be appreciated that the modified configuration of FIG. 6 also may be used with the other heat sources described herein. Generally, in regard to other aspects, the combustion turbine system 70 as depicted in FIG. 6 may operate similarly to the system described above in relation to FIG. 5.

Figure 7:
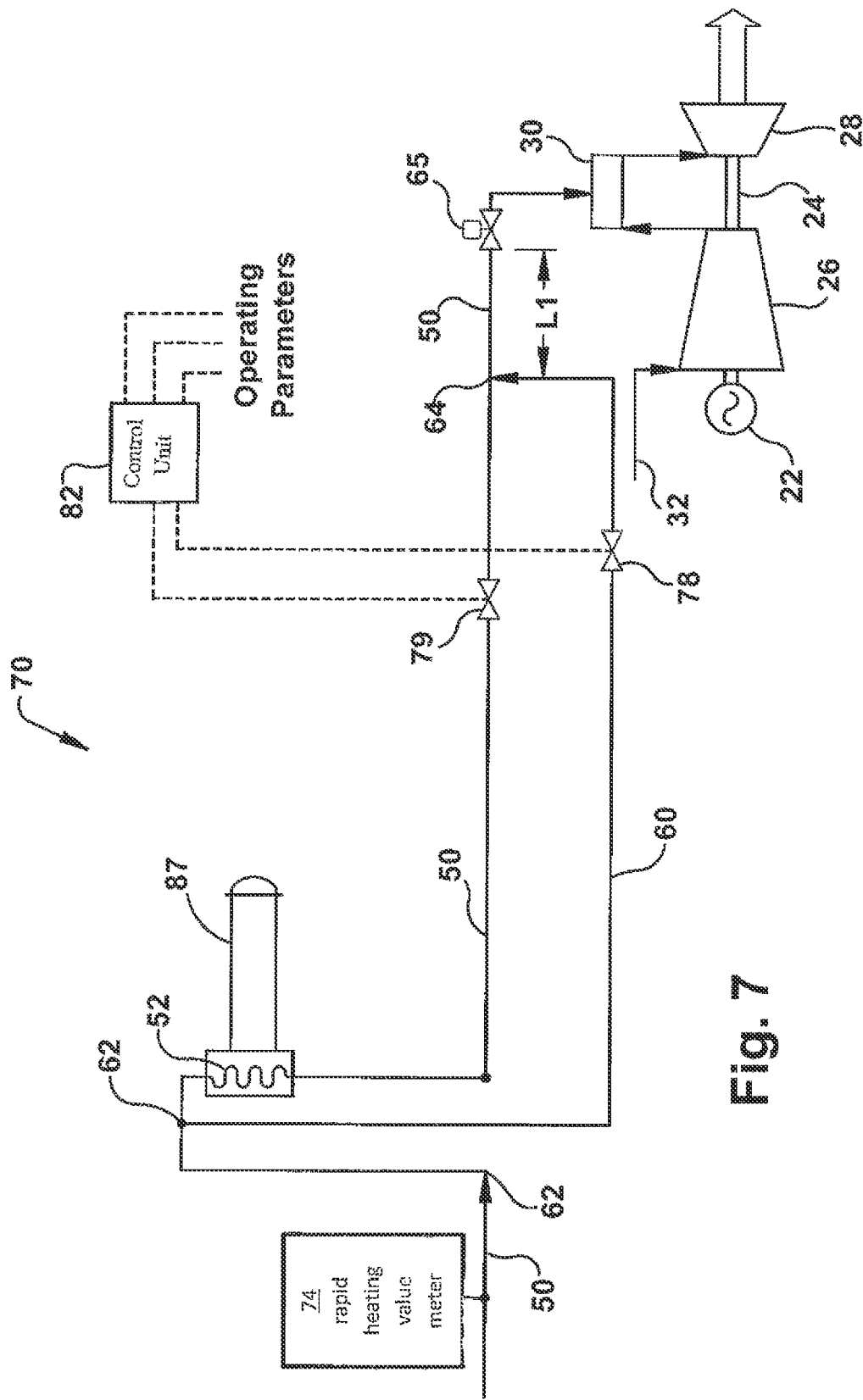
FIG. 7 is a schematic representation of a fuel delivery system of a combustion turbine engine according to an alternative embodiment of the present application.

Referring now to FIG. 7, the combustion turbine system 70 is shown with a modified configuration. That is, the heat source for the system of FIG. 7 is a direct fired heater 87. As one of ordinary skill in the art will appreciate, in general, a direct fired heater 87 comprises a device that combusts a supply of fuel and, using a heat exchanger, heats the fuel flowing through fuel line 50 with the heat from the combustion. In this manner, the direct fired heater 87 may be configured such that it provides the heat exchange portion 52 used to heat the fuel supply. One of the advantages of using the direct fired heater 87 is that it may heat the fuel supply of fuel line 50 without the necessity of heat input from the combustion turbine engine. It will be appreciated that this may be advantageous during engine startup when heat from the turbine engine is substantially unavailable.

Referring now to FIG. 8, the combustion turbine system 70 is shown with another modified configuration. As shown, the system illustrated in FIG. 8 is substantially similar to the system illustrated in FIG. 7 except for the addition of a three-way valve 90 at the fuel mixing junction 64. The three-way valve 90 generally takes the place of the cold leg valve 78 and the hot leg valve 79, and may include any suitable conventional three-way valve 90. As one of ordinary skill in the art will appreciate, similar to the operation of the dual two-way valves, the three-way valve 90 may control the mixing of the fuel at the fuel mixing junction 64 such that the temperature of the fuel downstream of the fuel mixing junction 64 is regulated and controlled as desired. The configuration of FIG. 8 also may be used as part of the other system configurations discussed herein.

Figure 9:
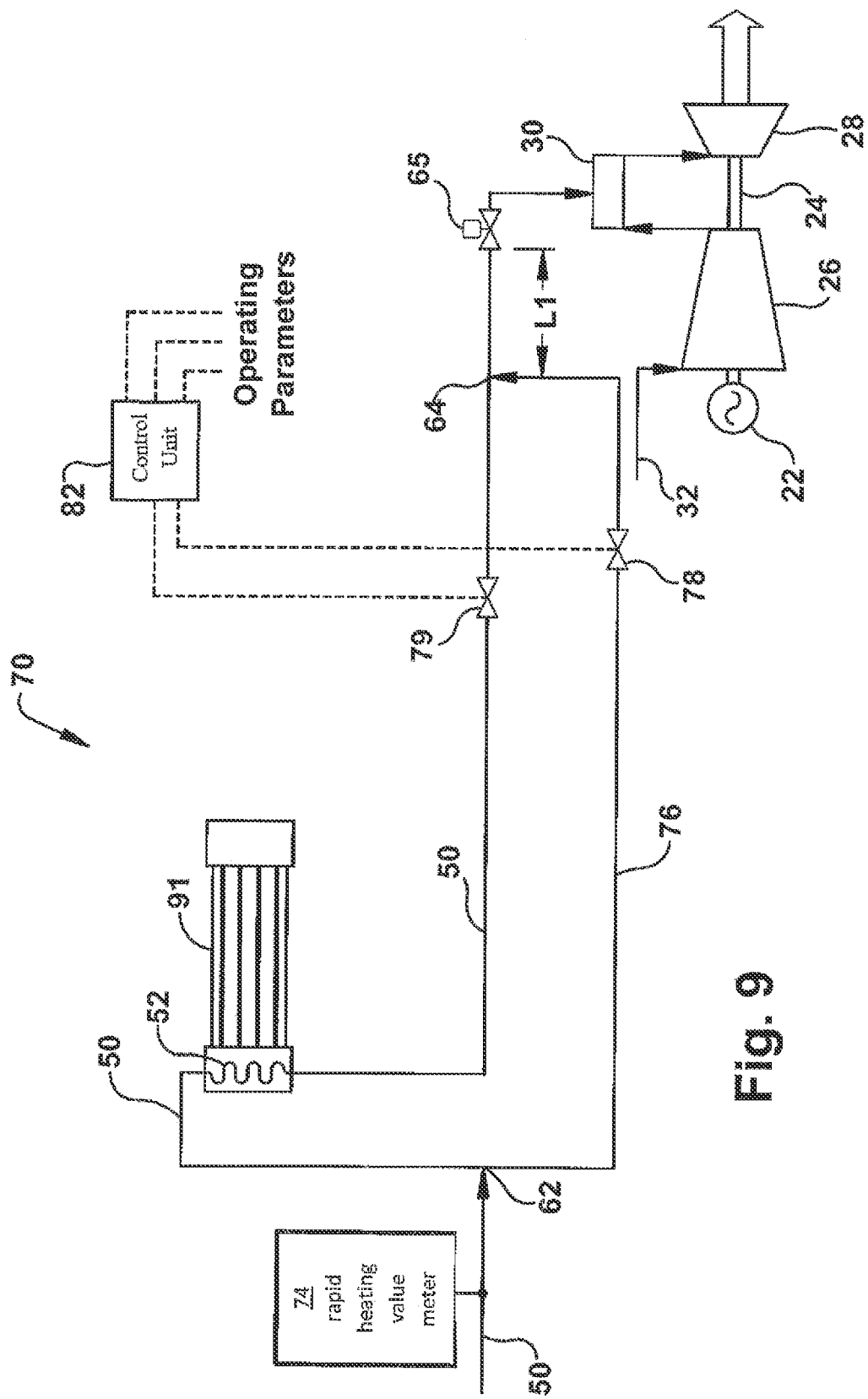
FIG. 9 is a schematic representation of a fuel delivery system of a combustion turbine engine according to an alternative embodiment of the present application.

Referring now to FIG. 9, the combustion turbine system 70 is shown with another modified configuration. As illustrated, the heat source for the system of FIG. 9 is an electric heater 91. As one of ordinary skill in the art will appreciate, in general, the electric heater 91 comprises an electric heating element that provides heat to a heat exchanger. The heating element of the electric heater 91 may be configured such that it provides the heat exchange portion 52 used to heat the fuel supply. One of the advantages of using the electric heater 91 is that it may heat the fuel supply without using exhaust heat from the turbine engine. This may be advantageous during turbine engine startup when heat from the turbine engine is substantially unavailable.

Figure 10:
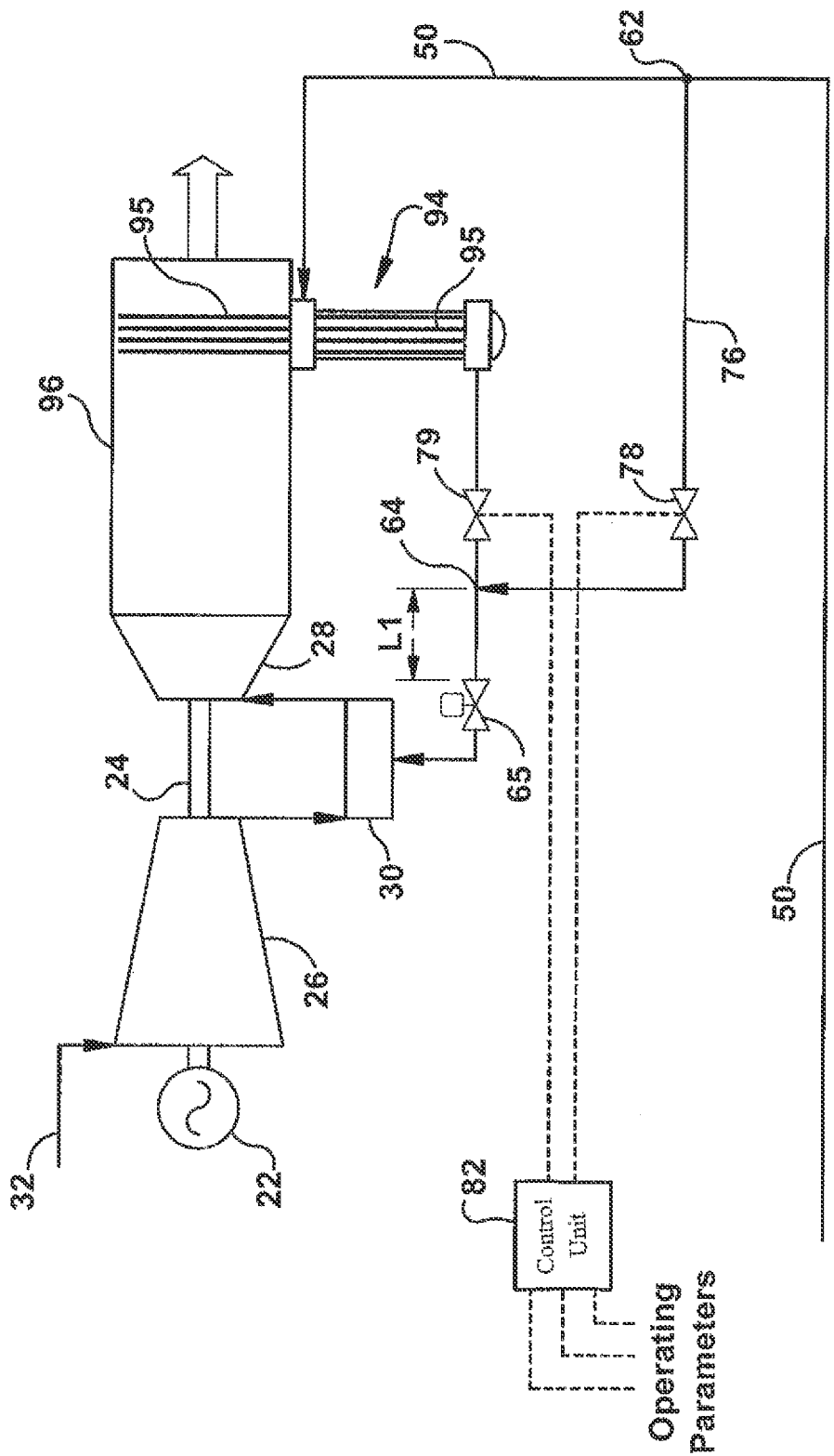
FIG. 10 is a schematic representation of a fuel delivery system of a combustion turbine engine according to an alternative embodiment of the present application.

Referring now to FIG. 10, the combustion turbine system 70 is shown with another modified configuration. As illustrated, the heat source for the system of FIG. 10 is a heat pipe heat exchanger 94. In general, the heat pipe heat exchanger 94 may include multiple conductive pipes 95 that extend from within an exhaust conduit 96 through which turbine exhaust gases flow. The conductive pipes 95 may conduct heat from the turbine exhaust such that the heat may be used to heat the flow of fuel. That is, the heat pipe heat exchanger 94 may be configured such that it provides the heat exchange portion 52 used to heat the fuel supply. The advantages of using the heat pipe heat exchanger 94 include the proximity of the heat exchange portion 52 to the combustion turbine engine. This may minimize conduit length and provide the ability to use the heat source quickly after the turbine engine startup process has begun. Further, the heat pipe heat exchanger 94 provides the advantage of maintaining a separation between turbine exhaust and the fuel supply while still using the heat from the exhaust to heat the fuel supply. Other heat sources may be used also, including a conventional steam or hot-water heater. The steam or hot-water heater may be pressurized or non-pressurized. The steam or hot-water heater may be powered by a separate boiler or may be heated via the exhaust of the turbine engine.

As stated, the control unit 82 may have programmed logic that monitors one or more operational parameters and that may control the function of the one or more valves such that, in accordance with exemplary embodiments of the present invention, the fuel supply is delivered to the combustor at a preferred MWI rating or within preferred range of MWI ratings, which, as stated, will be referred to here as a target MWI range As one of ordinary skill in the art will appreciate, algorithms, control programs, logic flow diagrams, and/or software programs, as described in detail below, may be developed to monitor changing operational parameters of a combustion turbine engine system so that, by controlling the temperature at which the fuel is delivered to the combustor, the MWI rating of the fuel supply to the combustor falls within the target MWI range. As one of ordinary skill in the art will appreciate, such a system may include multiple sensors and instruments, as discussed above, that monitor the relevant turbine engine operational parameters. These hardware devices and instruments may send data and information to and be controlled and manipulated by a conventional computer-implemented control system, such as control unit 82. That is, pursuant to conventional means and methods, a control system, such as control unit 82, may receive and/or acquire data from the combustion turbine system 70, process the data, communicate with the operators of the combustion turbine system, and/or control the various mechanical devices of the system pursuant to a set of instructions or logic flow diagram, which, as one of ordinary skill in the art will appreciate, may be made part of a software program that is operated by control unit 82, and which comprises an embodiment of the present invention.

Figure 11:
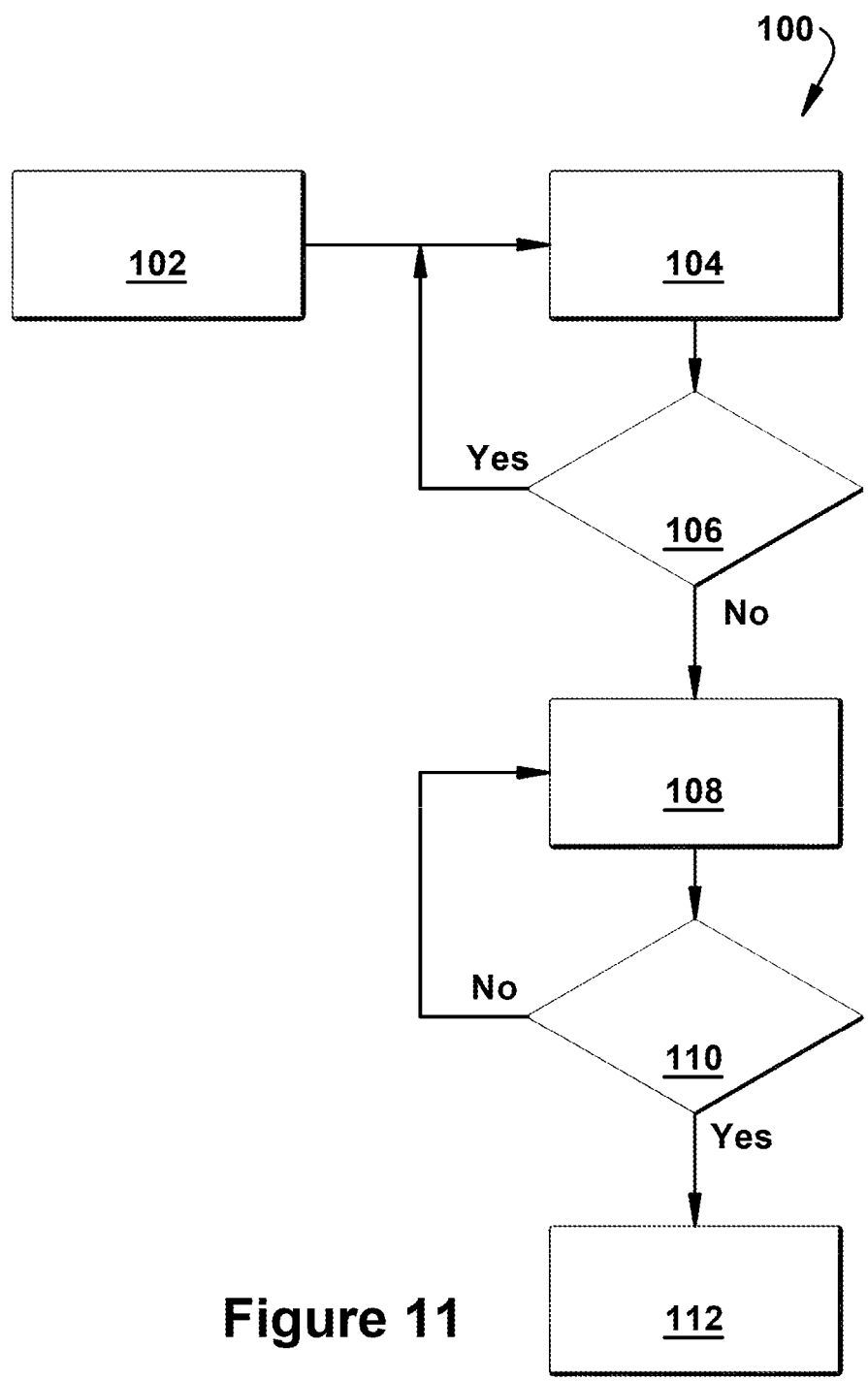
FIG. 11 is a flow diagram illustrating the operation of an exemplary embodiment of the present application.

FIG. 11 illustrates a logic flow diagram 100. As one of ordinary skill in the art will appreciate, the logic flow diagram 100 may be implemented and performed by the control unit 82. In some embodiments, the control unit 82 may comprise any appropriate high-powered solid-state switching device. The control unit 82 may be a computer; however, this is merely exemplary of an appropriate high-powered control system, which is within the scope of the application. For example, but not by way of limitation, the control unit 82 may include at least one of a silicon controlled rectifier (SCR), a thyristor, MOS-controlled thyristor (MCT) and an insulated gate bipolar transistor. The control unit 82 also may be implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that the control unit also may be implemented using a variety of separate dedicated or programmable integrated or other electronic circuits or devices, such as hardwired electronic or logic circuits including discrete element circuits or programmable logic devices, such as PLDs, PALs, PLAs or the like. The control unit 82 also may be implemented using a suitably programmed general-purpose computer, such as a microprocessor or microcontrol, or other processor device, such as a CPU or MPU, either alone or in conjunction with one or more peripheral data and signal processing devices. In general, any device or similar devices on which a finite state machine capable of implementing the logic flow diagram 100 may be used as the control unit 82. A distributed processing architecture may be preferred for maximum data/signal processing capability and speed.

Logic flow diagram 100 may begin at a step or block 102. At step 102, the control unit 82, pursuant to any of the methods discussed above, may receive, monitor, and record data relating to the operational parameters of the combustion turbine system 70, and, particularly, the fuel delivery system of the combustion turbine system 70. As described, the operational parameters may include one or more of the following: a heating value of the fuel supply (which, for example, may be measured via the rapid heating value meter 74 positioned upstream of the upstream fork 62); the temperatures of the fuel supply at various locations within the fuel delivery system (which, for example, may include an unheated temperature measurement, a heated temperature measurement, and/or a combustor inlet temperature measurement, as discussed above); and/or measurements relating to the flow rates through the cold leg bypass 76 and the heat exchange portion 52 of the fuel line 50 (which, for example, may include the setting of any of the valves that control the flow through these conduits, and may also include a fuel pressure measurement taken within any of these conduits, which may be achieved via a conventional pressure transducer positioned in, for example, the cold leg bypass 76 and/or the fuel line 50). From step 102, the process may continue to step 104. The measuring, monitoring, and/or recording of operational parameters may occur continuously or at regular intervals, and updated or current data may be used throughout any of the several steps of logic flow diagram 100 whether or not there is a direct line in FIG. 7 connecting step 104 to the other step.

At step 104, given the current measurement of the heating value of the fuel supply, the process may determine an acceptable temperature or temperature range at which the fuel supply should be delivered to the combustor 30 to satisfy a target MWI range. As described, combustion turbine engines generally are designed to operate with a fuel that has a certain heating value or heating value range. More particularly, engines may be designed for a target MWI range. In practice, the heating value of an engine's fuel supply generally varies. By changing the temperature of a fuel, the varying levels of heating value may be compensated for so that the target MWI range is satisfied. Specifically, the MWI rating of the fuel supply may be adjusted by raising or lowering the temperature of the fuel supply such that the fuel delivered to the combustor of the engine is at the prescribed or preferred MWI rating or within the range of prescribed or preferred MWI ratings for which the engine was designed. As stated, the prescribed or preferred MWI rating or the range of prescribed or preferred MWI ratings for the fuel for which an engine is designed are both referred to herein as the target MWI range. As one of ordinary skill in the art will appreciate, combustion turbine engines perform better, including more efficiently and reliably, when fuel is delivered to the combustor at an MWI rating that coincides with the target MWI range. Delivering fuel to the combustor outside of the target MWI range (i.e., which, may occur is the temperature of the fuel being delivered to the combustor does not produce a MWI rating within the target MWI range) may cause engine performance and efficiency losses and/or may damage turbine components. Also, as stated above, delivering fuel to the combustor 30 outside of the proper range may lead to a gas turbine "runback" situation, which may be highly undesirable because it generally results in the engine automatically taking the precautionary step of significantly reducing engine output. While this preventative action is done to minimize potential damage that might occur when the MWI rating of the fuel does not fall within the recommended range, the sudden loss of output may cause other issues that are highly undesirable as well.

The relationship between the MWI rating of a fuel and temperature of the fuel is an inverse one. That is, as the temperature of the fuel is increased, the MWI rating decreases. Alternatively, as the temperature of the fuel is decreased, the MWI rating increases. Thus, for example, assume that a fuel has a heating value of "X" and, given the target MWI range for which the turbine engine was designed, the range of acceptable temperatures at which this fuel may be delivered to maintain a MWI rating within the target MWI range constitutes a temperature range of between "Z" and "Y". If the heating value of the fuel supply increases to a value of (X+10), then, generally, the range of acceptable temperatures at which the fuel may be delivered to the combustor to maintain a MWI rating within the target MWI range generally decreases to a range of temperatures, for example, between (Z-20) and (Y-20). Accordingly, a combustion turbine engine generally has an accepted or recommended temperature and/or range of temperatures at which a fuel should be delivered to the combustor given the heating value of the fuel (i.e., a range of temperatures that maintains a MWI rating within the target MWI range). At step 104, this preferred temperature or recommended temperature range, which will hereafter be referred to as a "target temperature range", is determined. In sum, the target temperature range is the temperature value or range that, based on the heating value measurement taken by the rapid fuel heating value meter 74, maintains the MWI rating of the fuel as it is delivered to the combustor within the target MWI rating. The process may then continue to step 106.

At step 106, given the temperature of the fuel supply measured at the inlet of the combustor 30 (as measured and monitored as part of the continuing operation of step 102), the process may determine the following: is the temperature of the fuel supply at the approximate inlet of the combustor at or within the target temperature range calculated at step 104? If it is determined that the temperature of the fuel supply at the inlet of the combustor is at or within the target temperature range, the process may return to step 104. If it is determined that the temperature of the fuel supply at the inlet of the combustor is not at or within the target temperature range, the process may continue to step 108.

At step 108, the control unit may manipulate the settings of the cold leg valve 78 and/or the hot leg valve 79 so that the temperature of the fuel supply at the inlet of the combustor is at or within the target temperature range. For example, if it was determined that the temperature of the fuel being delivered to the combustor needs to be reduced (i.e., if the measured temperature at or near the combustor inlet is higher than the target temperature range), the settings for cold leg valve 78 and/or the hot leg valve 79 may be manipulated such that a greater portion of the fuel supply bypasses the heat exchange portion 52 of the fuel line 50. It will be appreciated that this will result in a decrease in the temperature of the fuel supply downstream of the mixing junction 64. Alternatively, if it was determined that the temperature of the fuel being delivered to the combustor needs to be increased (i.e., if the measured temperature at or near the combustor inlet is lower than the target temperature range), the settings for cold leg valve 78 and/or the hot leg valve 79 may be manipulated such that a decreased portion of the fuel supply bypasses the heat exchange portion 52 of the fuel line 50. It will be appreciated that this will result in an increase in the temperature of the fuel supply downstream of the mixing junction 64. As one of ordinary skill in the art will appreciate, in lieu of the two two-way valves, the three-way valve 90 may be used to control the mixture of the heated and unheated fuel in a similar manner.

At step 110, given the temperature of the fuel supply measured at the inlet of the combustor 30 that resulted from the action taken at step 108, the process may determine the following: is the temperature of the fuel supply at the inlet of the combustor within the target temperature range calculated at step 104? If it is determined that the temperature of the fuel supply at the inlet of the combustor is within the target temperature range (thereby producing fuel within the target MWI range), the process may proceed to step 112. If, however, it is determined that the temperature of the fuel supply at the inlet of the combustor is still not within the target temperature range (thereby failing to produce fuel within the target MWI range), the process may proceed to step 108 where the valves 76, 78 (or, in some cases, the three-way valve 90) may be adjusted another time. The process may repeat the control loop between steps 108 and 110 until the temperature of the fuel being delivered to the combustor is at or within the target temperature range.

At step 112, the process may end. Alternatively, (not shown) the process may return to step 102 to begin again.

The example process elements of FIG. 11 are shown by way of example, and other process and flow diagram embodiments can have fewer or greater numbers of elements or steps, and such elements or steps can be arranged in alternative configurations in accordance with other embodiments of the invention. As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each possible iteration is not herein discussed in detail, though all combinations and possible embodiments embraced by the several claims below are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A fuel delivery system for a combustion turbine engine comprising:
    a fuel line connected to a source of fuel and connected to a combustor of the combustion turbine engine, the fuel line having a heat exchange portion disposed in heat transfer relationship with a heat source for heating the fuel prior to the fuel being delivered to the combustor;
    a rapid heating value meter disposed to measure the heating value of the fuel;
    a cold leg bypass comprising an alternate fuel line that bypasses the heat exchange portion of the fuel line, the cold leg bypass being connected to the fuel line at an upstream fork, which is disposed upstream of the heat exchange portion, and at a fuel mixing junction, which is disposed downstream of the heat exchange portion;
    a downstream bypass that comprises a second alternative fuel line that bypasses the heat exchange portion; and
    means for controlling the amount of fuel being directed through the heat exchange portion and the amount of fuel being directed through the cold leg bypass;
    wherein the fuel mixing junction is positioned such that the length of fuel line between the fuel mixing junction and the combustor gas control valve is between approximately 2 and 20 meters; and
    wherein the downstream bypass is connected to the fuel line at a first location, the first location being downstream of the upstream fork and upstream of the heat exchange portion, and a second location, the second location being upstream of the fuel mixing junction and downstream of the heat exchange portion.

2. The fuel delivery system of claim 1, wherein the combustion turbine engine comprises:

a compressor for compressing air for combustion, wherein the combustor is connected to the compressor for receiving compressed air from the compressor and the fuel from the fuel delivery system, the fuel being combusted therein and producing a combustion gas; and a turbine connected to the combustor and arranged to receive the combustion gas for driving the turbine with the combustion gas being exhausted from the turbine;

wherein the heat source for heating the fuel comprises one of: a water bath heater, a thermal oil bath heater, a direct fired heater, an electric heater, a heat pipe heat exchanger, a steam heater, a hot-water heater, and a heat exchanger that uses heat from the exhaust of the combustion turbine engine.

3. The fuel delivery system of claim 1, wherein:

the means for controlling includes a control unit;

the means for controlling includes at least one of a two-way cold leg valve positioned on the cold leg bypass, a two-way hot leg valve positioned on the fuel line, and a three-way valve positioned at the fuel mixing junction;

the control unit is configured to receive the heating value test results from the rapid heating value meter;

the control unit is configured to control the settings of at least one of the valves such that a portion of the fuel is directed through the heat exchange portion and a portion of the fuel is directed through the cold leg bypass so that a target temperature range for the fuel is maintained downstream of the fuel mixing junction;

the target temperature range for the fuel comprises the temperature at which, given the measured heating value of the fuel, the fuel comprises a target Modified Wobbe Index range; and the target Modified Wobbe Index range comprises at least one predetermined Modified Wobbe Index rating at which a fuel is preferable for use in the combustion turbine engine.

4. The fuel delivery system of claim 3, wherein the control unit is configured such that:

if an increase in the fuel temperature downstream of the fuel mixing junction is necessary given the target temperature range, the control unit controls at least one of the valves to increase the portion of fuel directed through the heat exchange portion of the fuel line; and if a decrease in the fuel temperature downstream of the fuel mixing junction is necessary given the target temperature range, the control unit controls at least one of the valves to decrease the portion of fuel directed through the heat exchange portion of the fuel line.

5. The fuel delivery system of claim 1, wherein the rapid heating value meter comprises a device that provides heating value test results within approximately 2 minutes of beginning the testing process.

6. The fuel delivery system of claim 1, wherein the rapid heating value meter comprises a device that provides heating value test results within approximately 1 minute of beginning the testing process.

7. The fuel delivery system of claim 1, wherein the rapid heating value meter comprises a device that provides heating value test results within approximately 30 seconds of beginning the testing process.

8. The fuel delivery system of claim 1, wherein the rapid heating value meter comprises a device that provides heating value test results within approximately 10 seconds of beginning the testing process.

9. The fuel delivery system of claim 1, wherein the fuel delivery system is configured to test the fuel at regular intervals, the regular intervals being less than approximately 30 seconds.

10. The fuel delivery system of claim 3, further including a plurality of temperature devices that measure fuel temperature and transmit the fuel temperature measurements to the control unit, the fuel temperature devices disposed to at least measure: a cold-fuel temperature taken at some point within the cold leg bypass or upstream of the upstream fork; a hot-fuel temperature taken at some point between the heat exchange portion and the fuel mixing junction; and a mixed fuel temperature taken at some point between the fuel mixing junction and the inlet of the combustor.

11. The fuel delivery system of claim 1, wherein the fuel mixing junction is positioned such that the length of fuel line between the fuel mixing junction and the combustor gas control valve is between approximately 4 and 15 meters.

12. The fuel delivery system of claim 1, wherein the fuel mixing junction is positioned such that the length of fuel line between the fuel mixing junction and the combustor gas control valve is between approximately 6 and 10 meters.

* * * * *

UNITED STATES PATENT AND TRADEMARK OFFICE
CERTIFICATE OF CORRECTION

| | | |
|---|---|---|
| PATENT NO. | : 8,572,975 B2 | Page 1 of 1 |
| APPLICATION NO. | : 12/480239 | |
| DATED | : November 5, 2013 | |
| INVENTOR(S) | : Bilton et al. | |

It is certified that error appears in the above-identified patent and that said Letters Patent is hereby corrected as shown below:

In the Specification:

In Column 4, Line 22, delete "compressor II" and insert -- compressor 11 --, therefor.

In Column 7, Line 6, delete "50 in." and insert -- 50 m. --, therefor.

In Column 10, Line 19, delete "portion 59" and insert -- portion 52 --, therefor.

Signed and Sealed this
Fourteenth Day of January, 2014

Michelle K. Lee
*Deputy Director of the United States Patent and Trademark Office*